United States Patent [19]

Wirth

[11] 4,285,412

[45] Aug. 25, 1981

[54] SCALE PROTECTED AGAINST THE INGRESS OF DUST AND WATER

[75] Inventor: Johannes Wirth, Zurich, Switzerland

[73] Assignee: Wirth, Gallo & Co., Zurich, Switzerland

[21] Appl. No.: 135,677

[22] Filed: Mar. 31, 1980

[30] Foreign Application Priority Data

Mar. 10, 1980 [EP] European Pat. Off. ........ 80101189.1

[51] Int. Cl.³ ..................... G01G 21/02; G01G 21/28
[52] U.S. Cl. .................................... 177/179; 177/180
[58] Field of Search ................................ 177/179, 180

[56] References Cited

U.S. PATENT DOCUMENTS

| | | | |
|---|---|---|---|
| 3,444,943 | 5/1969 | Tytus | 177/180 |
| 3,963,082 | 6/1976 | Meier | |
| 4,148,370 | 4/1979 | Luchinger et al. | 177/180 X |

FOREIGN PATENT DOCUMENTS

| | | |
|---|---|---|
| 2615289 | 10/1977 | Fed. Rep. of Germany |
| 56322 | 5/1944 | Netherlands |
| 8374 | of 1912 | United Kingdom |

*Primary Examiner*—George H. Miller, Jr.
*Attorney, Agent, or Firm*—Stevens, Davis, Miller & Mosher

[57] ABSTRACT

Scale protected against ingress of dust and water in which elements of the scale which are always present in any scale are combined with extremely simple additional mechanical means in order to achieve the desired protection, comprising a measuring system, a frame, at least one foot supporting said frame, a load support, guiding means for parallel and vertical guiding of said load support, at least one opening having an inner edge in said load support for said foot, an annular diaphragm mounted between said foot and said inner edge, said load support enclosing completely said measuring system, said frame and said guiding means.

5 Claims, 13 Drawing Figures

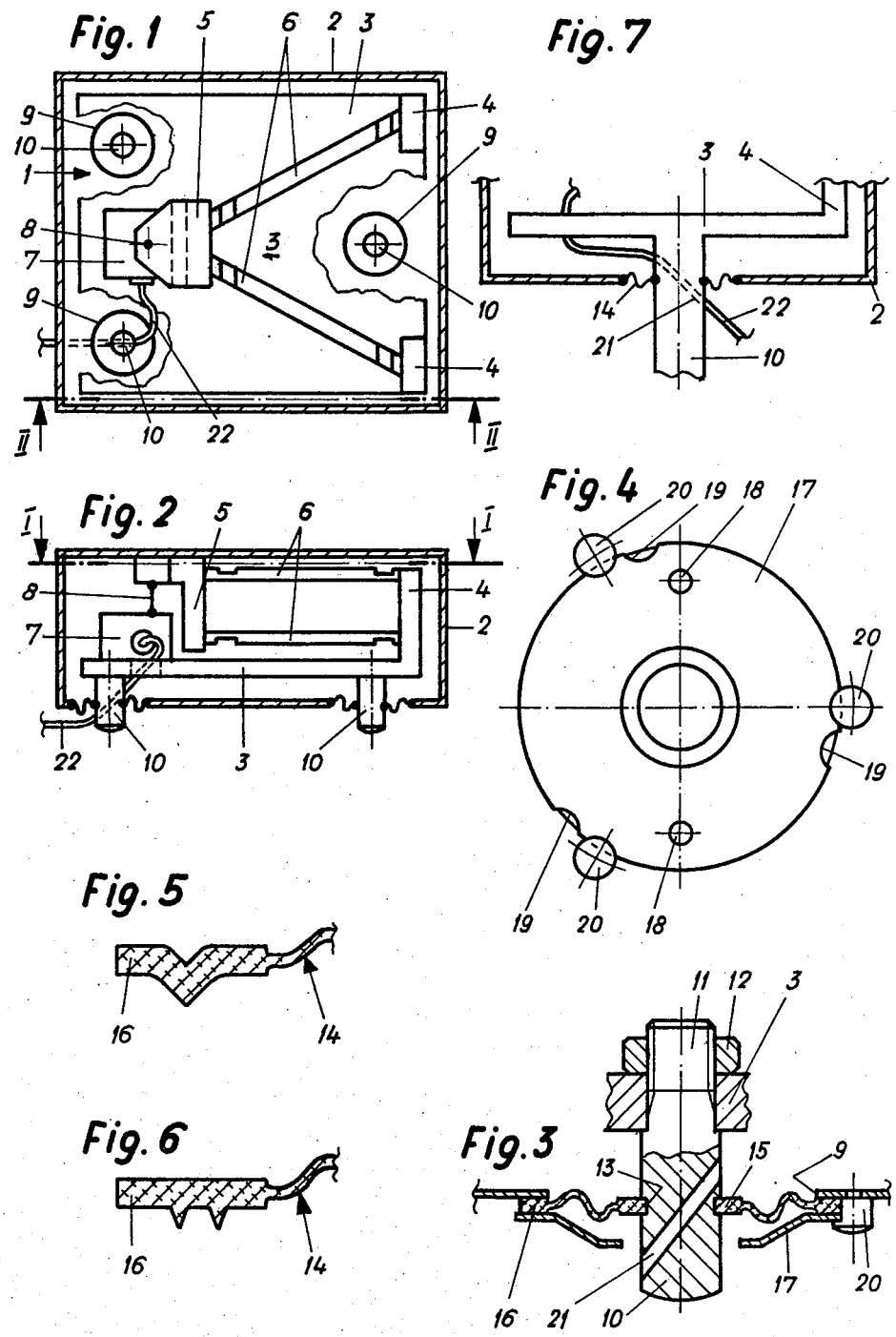

SCALE PROTECTED AGAINST THE INGRESS OF DUST AND WATER

The invention relates to a scale protected against ingress of dust and water comprising a measuring system, a frame with at least one foot, a load support and means for guiding this load support parallelly and vertically.

Scales are often used in applications where they are exposed to ingress of dust and/or splash water. It is well known to provide means preventing ingress of dust and humidity within the scale. The main drawback of all known implementations of such means is generally the amount of mechanical elements they require. The production costs of the scale become markedly higher, furthermore the total height of the scale is increased, so that it is not always possible to use it in some applications where this height is critical.

It is an object of the invention to provide a scale protected against ingress of dust and water in which elements of the scale which are always present in any scale are combined with extremely simple additional mechanical means in order to achieve the desired protection. The production costs of such a scale are not notably raised and the general design of the scale, in particular its height, is practically not influenced.

Another object of the invention is to provide in a scale, protected against the ingress of dust and water, a measuring system, a frame, at least one foot supporting said frame, a load support, guiding means for parallel and vertical guiding of said load support, at least one opening having an inner edge in said load support for said foot, an annular diaphragm mounted between said foot and said inner edge, said load support enclosing completely said measuring system, said frame and said guiding means.

Examples of embodiments of the invention are represented schematically in the enclosed drawing and described hereafter.

FIG. 1 is a view from above with a partial cross-section along line I—I of FIG. 2 of a first embodiment.

FIG. 2 is a view in elevation with partial cross-section along line II—II in FIG. 1.

FIG. 3 is a cross-section of a foot of the scale.

FIG. 4 is a view of a plate for fixing an isolating diaphragm.

FIGS. 5,6 show variants of the diaphragm.

FIG. 7 a variant of the first embodiment.

Figure 8:
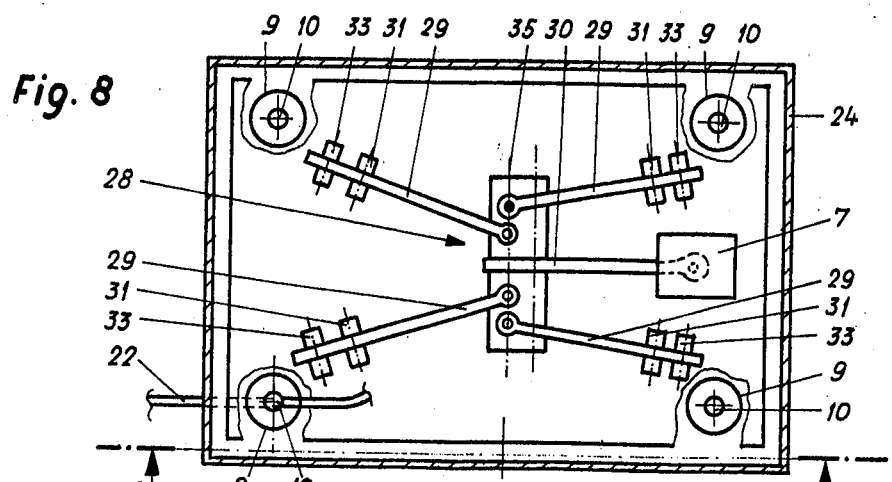
Figure 9:
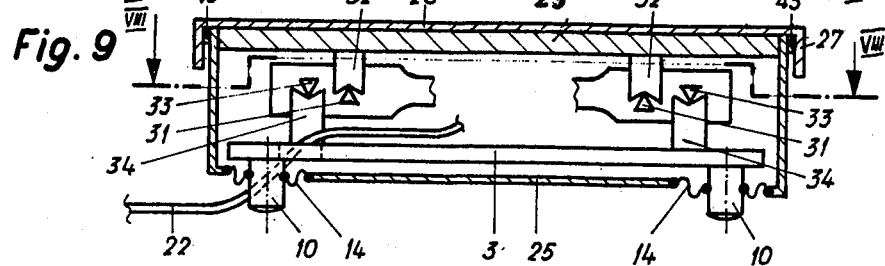

FIG. 8 is a view from above with partial cross-section along line VIII—VIII in FIG. 9 of a second embodiment.

FIG. 9 is a view in elevation with partial cross-section along line IX—IX in FIG. 8.

Figure 10:
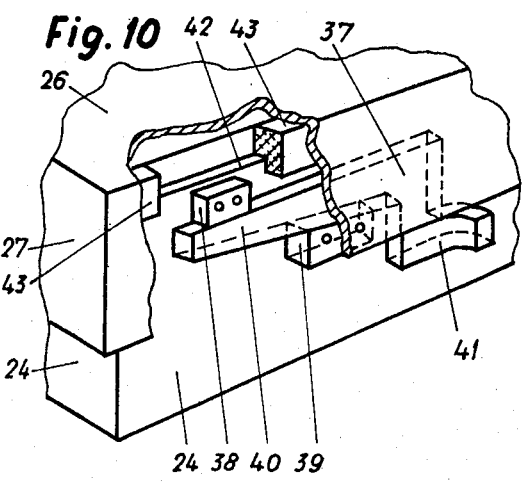
Figure 11:
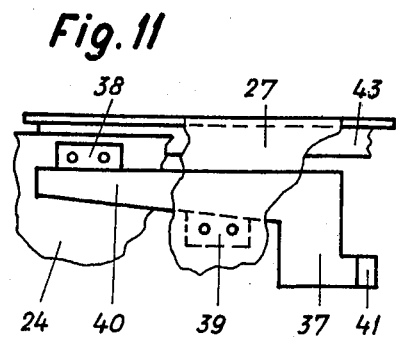

FIGS. 10, 11 show a locking device for the load support.

Figure 12:
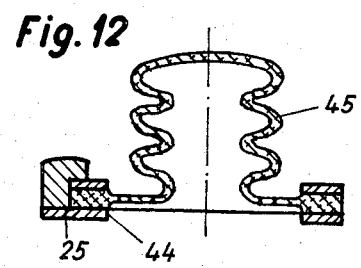
Figure 13:
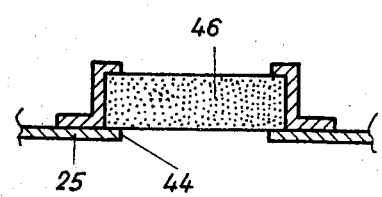

FIGS. 12, 13 show each an embodiment of means for pressure compensation.

The scale schematically shown in FIGS. 1-4 has a frame 1 and a load support 2. Frame 1 comprises a rigid plate 3 with two brackets 4. Load support 2 has one bracket 5. Two elastic guides 6 linked to frame 1 and to load support 2 guide the latter when it moves vertically so as to remain parallel to its position when unloaded. Guides 6 are mounted preferably in V-form as shown in FIG. 1. The measuring system 7 of the scale is also mounted on frame 1 and is linked to load support 2 by means of a rod 8. When load support 2 is loaded by a mass to be measured its load is transmitted to measuring system 7 by means of rod 8.

Load support 2 has the form of a closed parallelepiped, it encloses completely frame 1, guides 6 and measuring system 7. The bottom of load support 2 is provided with three holes 9 for three feet 10 supporting frame 1. Each foot 10 has a thread 11 at its upper end. It is secured to plate 3 by means of a nut 12 (FIG. 3). Foot 10 has a first external, annular, open groove 13. In order to ensure tightness between foot 10 and the edge of opening 9 an annular isolating diaphragm 14 is mounted in between. This diaghragm 14 has a thick inner edge 15 and a thick outer edge 16. Inner edge 15 is mounted under tension in groove 13 and outer edge 16 is fixed under the bottom of load support 2 by means of an annular plate 17. The latter has two small holes 18 so that it can be rotated by means of a suitable tool, so that its semi-circular cuttings 19 are radially aligned with fastening bolts 20 fixed to the bottom of load support 2. When plate 17 is rotated inner edge 16 of diaphragm 14 is forced against bolts 20 together with the outer edge of plate 17 and firmly held. Bolts 20 are correspondingly shaped (FIG. 3). One of feet 10 has an oblique internal groove 21 so that a cable 22 can be introduced within load support 2. This cable 22 connects measuring system 7 for instance with a display device or a data entry device, not shown.

When the scale is loaded, the load is transmitted by rod 8 to measuring system 7 which can be for instance a load cell with two vibrating strings well known in the art. The vertical movement of load support 2 is small, it ranges from 0.1 mm to 2 mm so that the theoretical reset force exerted by diaphragms 14 can be neglected, in particular if the maximum allowable load of the scale is high.

For the sake of simplicity load support 2 has been shown in the drawing as a closed parallelepiped. It is obvious that in practice one of its walls at least is mounted and secured to the other after mounting frame 1, guides 6 and measuring system 7 within load support 2.

In FIG. 3 edge 16 has a substantially rectangular cross-section. FIGS. 5, 6 show two variants of this cross-section.

In FIG. 7 a simplified variant of this first embodiment is shown in which frame 1 and one single foot 10 form one single element. Foot 10 is rather strong in this case. This embodiment is advantageous in cases where the maximum allowable load is relatively small so that the magnitude of the reset force of diaphragms 14 cannot always be neglected. As in this case only one such diaphragm must be provided, this possibility of influencing the result of the measurement is eliminated again or at least greatly reduced.

In FIGS. 8–11 a second embodiment is represented schematically. Load support 2 consists of a rigid plate 23, four side walls 24, a bottom plate 25 with four openings 9 for four feet 10 and a top plate 26 with side rims 27. Load support 2 is guided with respect to frame 1 by means of a levers system 28 of well known design. Levers system 28 comprises four corner levers 29 and a central lever 30. Load support 2 is carried by corner levers 29 by means of knives 31 and sockets 32. Corner levers 29 are supported by knives 33 and sockets 34 of frame 1. They act upon central lever 30 over a collecting knife 35 and central lever 30 acts upon measuring system 7 as explained for rod 8 in FIGS. 1–14.

In FIGS. 10-11 the device locking plate 26 to side walls 24 is shown. This device comprises a locking plate 37 and two small blocks 38, 39. Block 38 with a horizontal lower surface is secured to side wall 24. Block 39 with an oblique top surface is secured to the inside of side rim 27. Locking plate 37 comprises a long flat nose 40 and a finger 41 guided by the bottom edge of side rim 27. When locking plate 37 is pushed from right to left, as seen in FIG. 11, between blocks 38, 39, top plate 26 with side rims 27 is pulled downwards and held firmly against the top edges 42 of side walls 24. In order to ensure full tightness an elastic strip 43 of preferably square cross-section with a groove (see FIG. 10) is mounted on top edges 42. Normally two such locking devices are mounted on two parallel side walls 24. If required, three or four locking devices can be provided.

For scales with small maximum allowable load it is desirable to provide pressure compensation means. In this particular case bottom plate 25 has an additional opening 44 closed by an elastic bellow 45 (FIG. 12) or a porous wall 46 impregnated with oil.

In the embodiments shown measuring system 7 can be coupled by means of cable 22 with a display device not shown, mounted outside load support 2. If required by the application this display device could, of course, be mounted inside load support 2.

I claim:

1. In a scale protected against the ingress of dust and water a measuring system, a frame, at least one foot supporting said frame, a load support, guiding means for parallel and vertical guiding of said load support, at least one opening having an inner edge in said load support for said foot, an annular diaphragm mounted between said foot and said inner edge, said load support enclosing completely said measuring system, said frame and said guiding means.

2. In a scale protected against the ingress of dust and water a measuring system, a frame, at least one foot supporting said frame, a load support, guiding means for parallel and vertical guiding of said load support, at least one opening having an inner edge in said load support for said foot, an annular plate, an annular diaphragm mounted between said foot and said inner edge and secured by said annular plate, said load support enclosing completely said measuring system, said frame and said guiding means.

3. In a scale protected against the ingress of dust and water a measuring system, a frame, at least one foot supporting said frame, an oblique groove through said foot, a load support, guiding means for parallel and vertical guiding of said load support, at least one opening having an inner edge in said load support for said foot, an annular plate, a diaphragm mounted between said foot and said inner edge and secured by said annular plate, said load support enclosing completely said measuring system, said frame and said guiding means, a cable through said oblique groove connected to said measuring system.

4. In a scale protected against the ingress of dust and water a measuring system, a frame, at least one foot supporting said frame, a load support having a detachable top plate with side rims mounted on side walls, a locking device locking said top plate to said side walls, guiding means for parallel and vertical guiding of said load support, at least one opening having an inner edge in said load support for said foot, a diaphragm mounted between said foot and said inner edge, said load support enclosing completely said measuring system, said frame and said guiding means.

5. In a scale protected against the ingress of dust and water a measuring system, a frame, at least one foot supporting said frame, a load support, guiding means for parallel and vertical guiding of said load support, at least one opening having an inner edge in said load support for said foot, a diaphragm mounted between said foot and said inner edge, said load support enclosing completely said measuring system, said frame and said guiding means, means for pressure compensation between inside and outside of said load support.

* * * * *